United States Patent Office 2,982,788
Patented May 2, 1961

---

2,982,788

HYDROXYMETHYL DERIVATIVES OF RESORCINOL AND THEIR PRODUCTION

Jean Le Bras and Christian Pinazzi, Paris, France, assignors to Societe des Usines Chimiques Rhone-Poulenc, Paris, France, a body corporate of France No Drawing. Filed Sept. 11, 1958, Ser. No. 760,292

Claims priority, application France Sept. 20, 1957

9 Claims. (Cl. 260—621)

This invention relates to certain new hydroxymethyl derivatives of resorcinol and to their production.

Formaldehyde/resorcinol resins have in recent years received numerous applications, especially in the elastomer field, in which they have been proposed inter alia as rigidifying and reinforcing agents and as adhesives. These resins are employed in the form of so-called precondensates which are highly unstable and subject to rapid change, and consequently give rise to difficult problems in regard both to their storage and to the control of their change to the final stage in which the resin a three-dimensional and stable. Reproducibility, which is an important factor in industrial practice, is therefore rather poor in the preparation of these resins.

It is well known that the relative proportions of formaldehyde and resorcinol affect the nature of the final resin and that once the reaction between these two reactants has commenced it is difficult to stop it at a stable intermediate product. The idea of seeking to isolate the first product or products of the addition of formaldehyde to resorcinol is not novel, but it has not heretofore given any practical result. However, T. Boehm and H. Parlasca (Arch. Pharm. 270, 168–182, 1932) have prepared by an indirect method—reduction of dimethoxyaldehydes corresponding to resorcinol—a symmetrical monohydroxymethyl resorcinol (a)
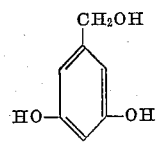

which according to these workers is stable and insensitive to acids, that is to say, incapable of functioning as a polycondensation monomer, so that it is of no practical interest in this connection. Boehm and Parlasca were unable to isolate the asymmetrical ortho-para derivative (b)

(b)
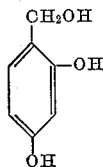

obtaining merely a resin.

It has now been found that it is possible to prepare, under conditions which will hereinafter be described, a technically useful mixture of the monohydroxymethyl derivative (b) and the dihydroxymethyl derivative (c) of the formula (c)
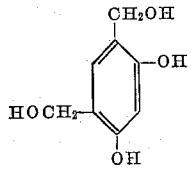

By following closely a procedure which is very critical in regard to the proportions of the reactants, the temperature, the reaction time, the pH and the nature of the atmosphere, a technical mixture of the compounds (b) and (c) in the approximate proportion of two parts of (b) to one part of (c) can be obtained in a good yield and with good reproducibility. By modifying the relative proportions of the reactants, the reaction can be controlled to produce preferentially 2:4-dihydroxy-hydroxymethyl benzene (b) or 2:4-dihydroxy-1:5-di(hydroxymethyl)benzene (c) which, after the appropriate washing operations and treatments, may be regarded as substantially pure. However, there is as a rule no obvious advantage in seeking to obtain either of the pure compounds, since the technical product consisting of the mixture of the two substances (b) and (c), which is obtained in a simpler manner, with greater reproducibility and in a higher yield, may be employed as it is in the majority of applications.

The process of the invention comprises causing resorcinol and formaldehyde in a molecular ratio between 1:0.8 and 1:2 to react in an initially alkaline aqueous medium, the pH of which is not allowed to fall below 7 at any time, in the absence of metals capable of catalysing the formaldehyde/resorcinol condensation and at a temperature which is allowed to rise above 30° C. during a space of 5–25 minutes, but is at all times below 50° C., then rapidly cooling the reaction product and maintaining it at a temperature not exceeding 5° C. until the product has crystallised, filtering, washing the crystals formed and drying them, the pH not being allowed to fall below 7 throughout all these operations.

The reaction and other conditions as set out above are critical and if they are departed from the results of the invention will not be achieved. In particular, it is most important that the pH should not at any time be allowed to fall below 7. The pH may tend to fall below 7 from absorption of carbon dioxide from the surrounding atmosphere and therefore the product should be protected as much as possible from the action of carbon dioxide. Similarly, it is important to exclude all metals, especially iron, which can catalyse the formaldehyde/resorcinol condensation.

The reaction is exothermic and cooling will usually be necessary to keep the temperature within the necessary limits. Preferably it is allowed to rise to about 42° C., and to remain at this level for at most a few minutes, say 5–8 minutes, and especially for about 45 seconds. The solution is then rapidly cooled. By ensuring that the reaction and the cooling is effected in a carbon dioxide free atmosphere, preferably nitrogen, the pH of the medium does not fall below 7 and no polycondensation results.

The product is then allowed to crystallise; this will usually require between 10 minutes and four hours. It is preferable that crystallisation should be rapid and to this end it is advisable to keep the solution at a temperature between about —20° C. and 0° C., still in a current of nitrogen. Crystallisation may also be assisted by adding a few crystals of one or other or both of the hydroxymethyl resorcinols formed in a previous operation. The longer the products remain in contact with the aqueous medium, the greater is the likelihood of some polycondensation occurring.

The crystals thus formed may be filtered immediately by the most rapid means, and then washed by being taken up several times in a little iced water and immediately filtered. After being washed the crystals must be freed from all traces of water as rapidly as possible, the operation again being carried out away from carbon dioxide, for example, by cooling the washed crystal cake while it is still slightly moist to about —80° C. and subliming the water under a high vacuum. Other methods of rapidly washing the crystals free from unchanged resorcinol and drying them may be employed.

As has been said, it is possible, in so far as this is of any technical interest, to steer the reaction towards the derivative (b) or towards the derivative (c). In order to increase the proportion of (b), it is convenient to reduce by 10% to 20% the proportion of formaldehyde used in the production of the technical product; thus the resorcinol:formaldehyde molar ratio may be between 1:0.8 and 1:0.95. It is then necessary to eliminate the excess resorcinol by thorough washing, preferably with vary cold water (melting ice). The monohydroxymethyl derivative so obtained can be purified by recrystallisation.

In order to obtain the derivative (c), on the other hand, the proportion of formaldehyde is increased substantially to twice the equimolecular quantity. The derivative (c), being the less soluble, may be very intensively washed to eliminate the derivative (b).

These two substances are obtained as colourless crystals of generally acicular form, which are frequently grouped together in clusters of appearance resembling an echinoid. The instantaneous melting points are difficult to determine, because the products melt with decomposition, liberation of water and resinification. There is obtained on the Maquenne block an insoluble and infusible resin of a colour ranging from orange-red to brownish red. The technical product as most usually made consists of about two-thirds of the derivative (b) and about one-third of the derivative (c); its instantaneous melting point is of the order of 148° to 155° C. The derivative (c) melts at over 200° C.

The mean solubility of the technical product at 20° C. in water is 30 to 40 g./l., while it reaches about 300 g./l. in pyridine. The solubility in ethanol is similar to that in water, and, contrary to all expectation, the product (c) is even less soluble in water than the derivative (b).

The monomeric state of the two substances (b) and (c) has been clearly established by structural analysis, and benzoic and isophthalic acids produced by oxidising the dimethoxy derivative obtained from (b) and (c) have been identified. These acids were found to be identical with the known 2,4-dimethoxybenzoic and 4,6-dimethoxyisophthalic acid, a finding which unambiguously confirmed the 1,2,4-orientation of (b) and the 1,2,4,5-orientation of (c).

The products of the invention are stable when they are absolutely anhydrous and away from the carbon dioxide of the air and from any trace of acid catalysts. They are therefore storable, despite their great reactivity, provided that certain obvious precautions are taken. In aqueous solution, they polycondense spontaneously even at room temperature, and much more rapidly as soon as the temperature rises. The various catalysts used to promote polycondensations of this general type, e.g. ferric chloride, ammonium phosphates and sulphate, acids and alkalis, very distinctly affect the speed of the polycondensation.

In the dry state, the monomers and monomer mixture polycondense very rapidly on heating, with the loss of the calculated quantity of water. The polycondensation also takes place at room temperature under the influence of the carbon dioxide of the air and of humidity, but several months may elapse before the reaction is substantially complete. Thus the new compounds can be used to produce thermohardenable resins, as also adhesives, and reinforcing agents for elastomers.

For industrial applications, it is unnecessary to keep new compounds wholly in the monomeric form, and the presence of dimers, trimers and tetramers, which may be formed during long storage if the conditions are not quite ideal, does not necessarily constitute an obstacle to the applications envisaged. Finally, it should be particularly emphasised that the mixture of the two monomers (b) and (c) constitutes, on the industrial plane, the technically most interesting product, though the use of the two pure products taken separately is by no means excluded. The mixture is particularly recommended as a reinforcing agent for elastomers.

The following examples illustrate without limiting the invention.

*Example I*

*Preparation of technical hydroxymethyl resorcinol (mixture)*

100 g. of resorcinol are dissolved in 100 g. of a 30% aqueous solution of formaldehyde. 50 g. of a normal sodium hydroxide solution are added. The reaction is exothermic and the external cooling is so adjusted that a temperature of 40° to 42° C. is reached in about 10 minutes. This temperature is maintained for 40 to 45 seconds, whereafter the mixture is cooled to about 18° C. The pH of the solution does not fall below 7. The solution is then introduced into a cooling bath whereby it is cooled to about −5° C., and a current of nitrogen free from carbon dioxide is bubbled therethrough. A number of crystals from a previous operation are introduced.

White crystals start to precipitate, and precipitation is complete after about 1 hour. The precipitate is filtered, rapidly washed with water and then with acetone, and dried in a vacuum desiccator.

*Example II*

*Preparation of 2:4-dihydroxy-hydroxymethyl benzene*

The procedure of Example I is followed, except that 120 g. of resorcinol are used and a more thorough washing with water is employed to eliminate the unreacted resorcinol.

*Example III*

*Preparation of 2:4-dihydroxy-1:5-di(hydroxymethyl) benzene*

110 g. of resorcinol are dissolved in 200 g. of a 30% formaldehyde solution and 50 g. of a normal sodium hydroxide solution are added. The procedure of Examples I and II is followed. The precipitation takes longer and it is desirable to effect very thorough washing with water in order to eliminate the resorcinol and the monohydroxymethyl resorcinol which is also formed.

We claim:

1. Monomeric 2,4 - dihydroxy - 1,5 - di(hydroxymethyl)benzene.

2. Process for the production of 2,4 - dihydroxy - hydroxymethyl benzene and 2,4 - dihydroxy - 1,5 - di(hydroxymethyl)benzene, which comprises causing resorcinol and formaldehyde in a molecular ratio between 1:0.8 and 1:2 to react in an initially alkaline aqueous medium, the pH of which is not allowed to fall below 7 at any time, in the absence of metals capable of catalysing the formaldehyde/resorcinol condensation and at a temperature which is allowed to rise above 30° C. during a space of 5–25 minutes, but is at all times below 50° C., then rapidly cooling the reaction product and maintaining it at a temperature not exceeding 5° C. until the product has crystallised, washing the crystals formed and drying them, the pH not being allowed to fall below 7 throughout all these operations.

3. Process for the production of 2,4-dihydroxy-hydroxymethyl benzene and 2,4-dihydroxy-1,5-di(hydroxymethyl)benzene, which comprises causing resorcinol and formaldehyde in a molecular ratio between 1:08 and 1:2 to react in a medium which is initially an aqueous solution of pure sodium hydroxide, the pH of which is not allowed to fall below 7 at any time, in the absence of metals capable of catalysing the formaldehyde/resorcinol condensation and at a temperature which is allowed to rise above 30° C. during a space of 5–25 minutes, but is at all times below 50° C., then rapidly cooling the reaction product and maintaining it at a temperature not exceeding 5° C. until the product has crystallised, washing the crystals formed and drying them, the pH not being allowed to fall below 7 throughout all these operations.

4. Process for the production of 2,4-dihydroxy-hydroxymethyl benzene and 2,4-dihydroxy-1,5-di(hydroxymethyl)benzene, which comprises causing resorcinol and formaldehyde in a molecular ratio between 1:0.8 and 1:2 to react in an initially alkaline aqueous medium, the pH of which is not allowed to fall below 7 at any time, in the absence of metals capable of catalysing the formaldehyde/resorcinol condensation and at a temperature which is allowed to rise to about 42° C. during a space of 5–25 minutes, then rapidly cooling the reaction product and maintaining it at a temperature not exceeding 5° C. until the product has crystallised, washing the crystals formed and drying them, the pH not being allowed to fall below 7 throughout all these operations.

5. Process for the production of 2,4-dihydroxy-hydroxymethyl benzene and 2,4-dihydroxy-1,5-di(hydroxymethyl)benzene, which comprises causing resorcinol and formaldehyde in a molecular ratio between 1:0.8 and 1:2 to react in an initially alkaline aqueous medium, the pH of which is not allowed to fall below 7 at any time, in the absence of metals capable of catalysing the formaldehyde/resorcinol condensation and at a temperature which is allowed to rise above 30° C. during a space of 5–25 minutes, but it at all times below 50° C., then rapidly cooling the reaction product and maintaining it at a temperature not exceeding 5° C. until the product has crystallised, washing the crystals formed and drying them, the pH not being allowed to fall below 7 throughout all these operations, the hydroxymethylated benzenes being protected from the carbon dioxide of the air.

6. Process for the production of 2,4-dihydroxy-hydroxymethyl benzene and 2,4-dihydroxy-1,5-di(hydroxymethyl)benzene, which comprises causing resorcinol and formaldehyde in a molecular ratio between 1:0.8 and 1:2 to react in an initially alkaline aqueous medium, the pH of which is not allowed to fall below 7 at any time, in the absence of metals capable of catalysing the formaldehyde/resorcinol condensation and at a temperature which is allowed to rise above 30° C. during a space of 5–25 minutes, but is at all times below 50° C., then rapidly cooling the reaction product and maintaining it at a temperature not exceeding 5° C. until the product has crystallised, washing the crystals formed and drying them, the pH not being allowed to fall below 7 throughout all these operations, the process being carried out in an atmosphere of nitrogen.

7. Process for the production of 2,4-dihydroxy-hydroxymethyl benzene and 2,4-dihydroxy-1,5-di(hydroxymethyl)benzene, which comprises causing resorcinol and formaldehyde in a molecular ratio between 1:1 and 1:1.1 to react in an initially alkaline aqueous medium, the pH of which is not allowed to fall below 7 at any time, in the absence of metals capable of catalysing the formaldehyde/resorcinol condensation and at a temperature which is allowed to rise above 30° C. during a space of 5–25 minutes, but is at all times below 50° C., then rapidly cooling the reaction product and maintaining it at a temperature not exceeding 5° C. until the product has crystallised, washing the crystals formed and drying them, the pH not being allowed to fall below 7 throughout all these operations.

8. Process for the production of 2,4-dihydroxy-hydroxymethyl benzene and 2,4-dihydroxy-1,5-di(hydroxymethyl)benzene, which comprises causing resorcinol and formaldehyde in a molecular ratio between 1:0.8 and 1:0.95 to react in an initially alkaline aqueous medium, the pH of which is not allowed to fall below 7 at any time, in the absence of metals capable of catalysing the formaldehyde/resorcinol condensation and at a temperature which is allowed to rise above 30° C. during a space of 5–25 minutes, but is at all times below 50° C., then rapidly cooling the reaction product and maintaining it at a temperature not exceeding 5° C. until the product has crystallised, washing the crystals formed and drying them, the pH not being allowed to fall below 7 throughout all these operations.

9. Process for the production of 2,4-dihydroxy-hydroxymethyl benzene and 2,4-dihydroxy-1,5-di(hydroxymethyl)benzene, which comprises causing resorcinol and formaldehyde in a molecular ratio of approximately 1:2 to react in an initially alkaline aqueous medium, the pH of which is not allowed to fall below 7 at any time, in the absence of metals capable of catalysing the formaldehyde/resorcinol condensation and at a temperature which is allowed to rise above 30° C. during a space of 5–25 minutes, but is at all times below 50° C., then rapidly cooling the reaction product and maintaining it at a temperature not exceeding 5° C. until the product has crystallised, washing the crystals formed and drying them, the pH not being allowed to fall below 7 throughout all these operations.

References Cited in the file of this patent

Sen et al.: Jour Amer. Chem. Soc., vol. 47 (April, 1925), pp. 1084–85 (2 pages).